Oct. 1, 1929.   N. H. MASSIE   1,729,886

FRUIT VENDING MACHINE

Filed Aug. 6, 1928   3 Sheets-Sheet 1

INVENTOR
Noah H. Massie
BY
Carl H. Crawford
ATTORNEY

Oct. 1, 1929. N. H. MASSIE 1,729,886
FRUIT VENDING MACHINE
Filed Aug. 6, 1928    3 Sheets-Sheet 2
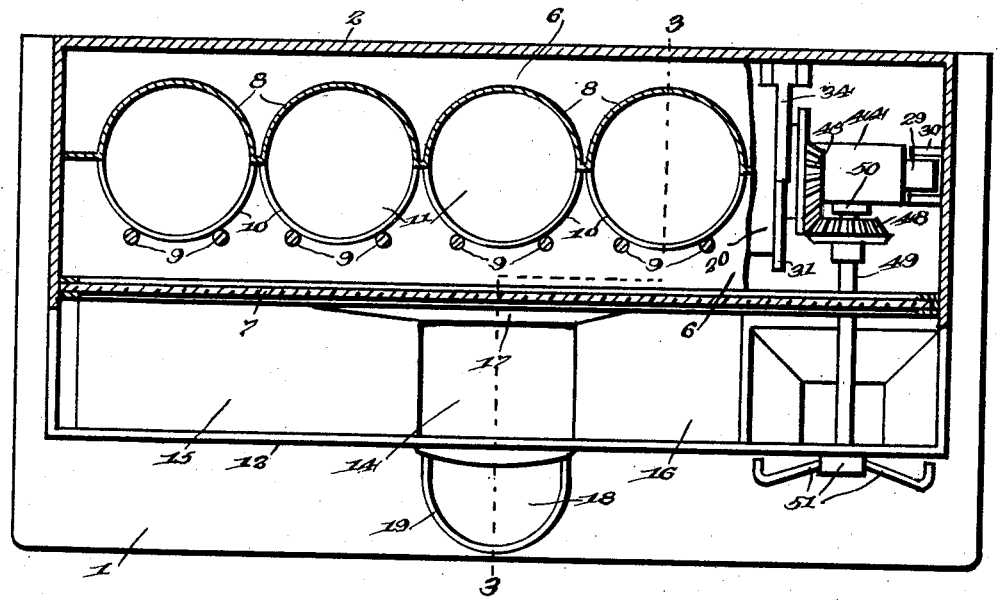
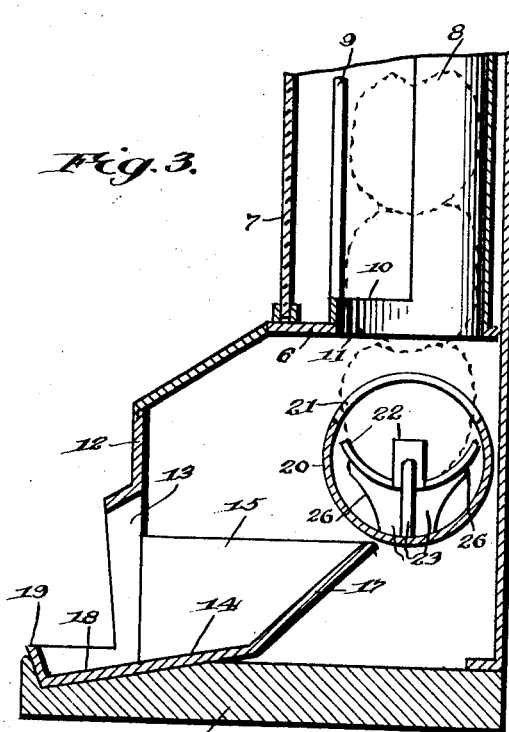
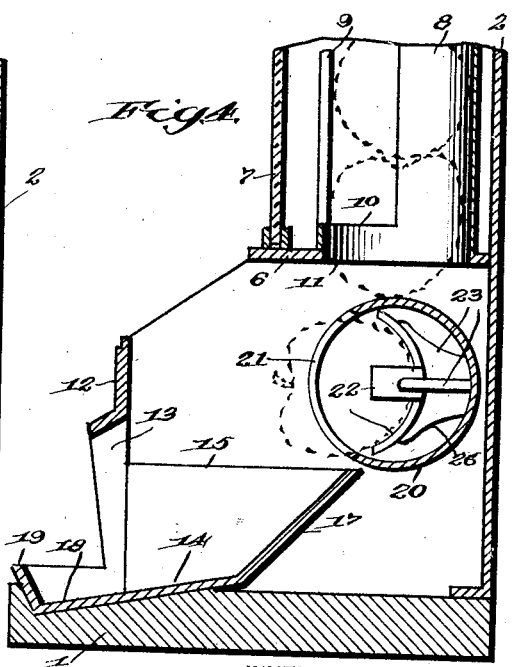
INVENTOR
Noah H. Massie
BY
Carl H. Crawford
ATTORNEY

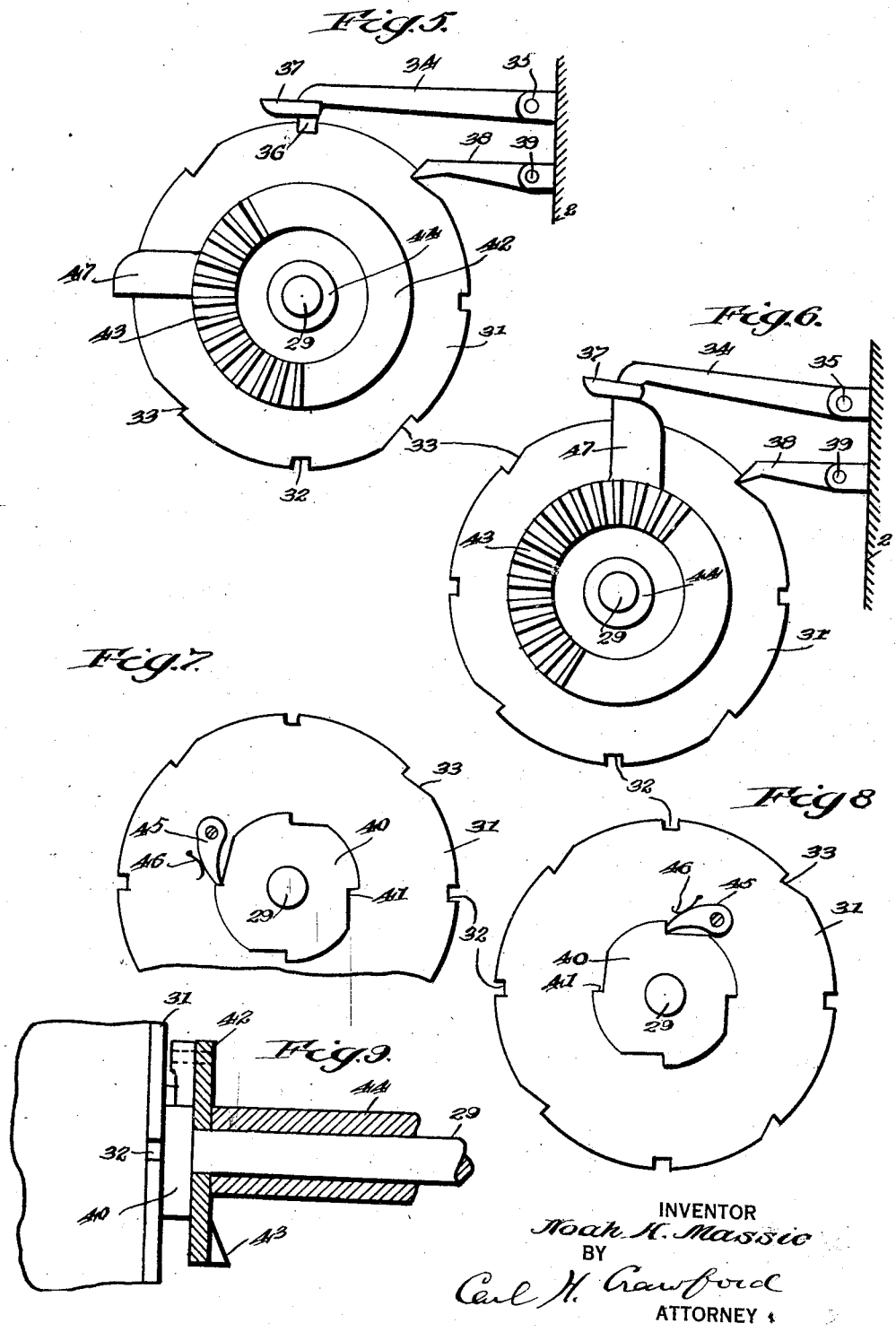

Patented Oct. 1, 1929

1,729,886

UNITED STATES PATENT OFFICE

NOAH H. MASSIE, OF YAKIMA, WASHINGTON, ASSIGNOR TO APPLE VENDER COMPANY, OF SEATTLE, WASHINGTON, A CORPORATION OF WASHINGTON

FRUIT-VENDING MACHINE

Application filed August 6, 1928. Serial No. 297,741.

This invention relates to improvements in vending machines and has to do more particularly with this class of machines which are designed and adapted for vending substantially spherical bodies such for instance as apples, oranges and the like.

It is a feature of the invention to house a plurality of vertical rows or columns of fruit entities in superimposed relation for gravity delivery of the entities at or near the lower ends of the columns.

It is a further feature of the invention to provide novel delivery means at the base of the columns for controlling delivery of fruit entities in serial order from the columns so that the latter will, while charged, always disclose practically uniform columns of fruit.

It is a feature of the delivery means to function not only in effecting delivery of the fruit entities, but also, to support the entities that are not being delivered.

It is a further feature to utilize an entity that is ready for delivery, for the purpose of supporting the remainder of the column free from engagement with the delivery means until the latter has been advanced toward a delivery position.

It is a still further feature of the invention to provide a novel form of delivery means which is adapted to be advanced step by step in the performance of its delivery function, and wherein said means always normally contains an entity to be subsequently delivered.

The invention will be more fully described in connection with the accompanying drawings and will be more particularly pointed out in and by the appended claims.

In the drawings:

Fig. 2, is a sectional view on line 2—2 of Fig. 1.

Fig. 3, is a sectional view on line 3—3 of Fig. 2.

Fig. 4, is a sectional view similar to Fig. 3, with the parts in a slightly different position.

Fig. 5, is a view in end elevation of the delivery cylinder looking from the right of Fig. 1 and taken on line 5—5 thereof.

Fig. 6, is a similar view with the parts in a slightly different position.

Fig. 7, is a view similar to Fig. 5, with parts broken away.

Fig. 8, is a view similar to Fig. 6.

Fig. 9, is an enlarged detail view.

Like characters of references designate similar parts throughout the different figures of the drawings.

Figure 1:
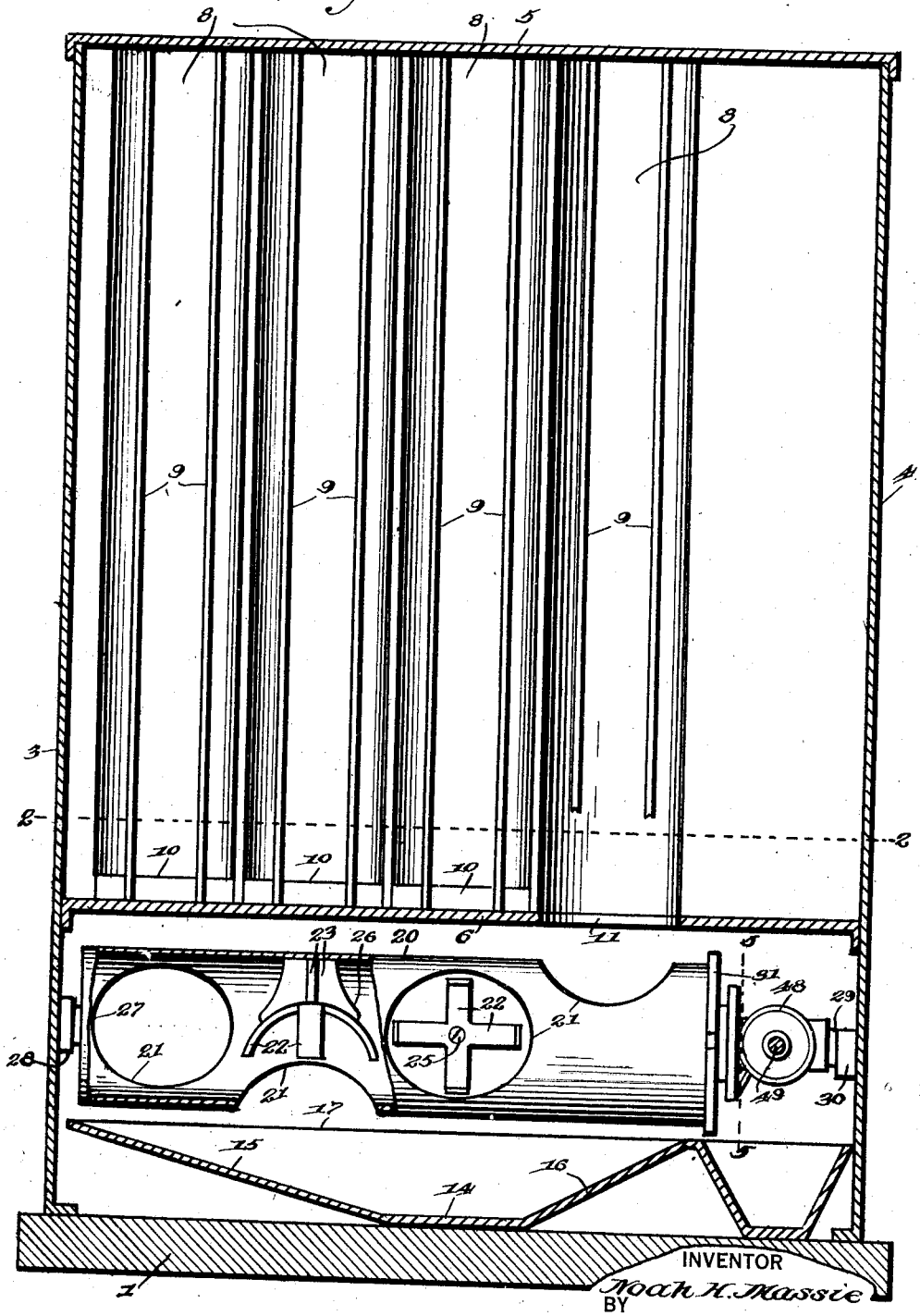
Fig. 1, is a view in front elevation, partly in section, showing the most improved form of the invention.

As illustrated, the machine includes a base 1 on which a casing structure is mounted and said structure includes a back wall 2, side walls 3 and 4, and a top wall 5. A horizontal wall which will be termed a delivery wall, is indicated at 6, and the usual glass front 7, suitably mounted, will be provided in order to render the fruit visible to the purchaser. Thus, it will be clear that the chamber formed above wall 6, will be the storage chamber for the fruit to be vended. In this storage chamber there is provided a plurality of housings for holding vertical columns of fruit entities in superimposed relation. Each housing, as shown, includes a semi-cylindrical back portion 8, extending throughout the height of the chamber and suitably mounted therein. In order to retain the entities within the housings, each of the latter includes rods 9, extending throughout the length of the housings, as shown, thereby clearly exposing the fruit to the buyer. Near the wall 6, an upwardly projecting flange 10, is provided for each housing to accurately guide the fruit entities through the delivery openings 11, in wall 6, one opening being provided for each housing. These housings are of such size, in cross section, as to accommodate the maximum size fruit to be vended and inclose such fruit with sufficient clearance to permit of gravity descent of the fruit through said openings 11.

This gravity descent of the fruit is important because, with the mechanism to be subsequently described, it avoids the necessity of providing special means for coacting with the fruit in addition to the delivery means that will be subsequently described.

As usual, the housings will be charged from the top, the upper wall 5 being removable for that purpose, and it will be seen from Fig. 2, that the housings are in a row and that the openings 11, are in linear relation. In other words, a center line will intersect all the centers of all the openings 11.

Next referring to that portion of chamber of the casing below walls 6, which will be termed the delivery chamber, it will be seen that the front wall 12, extends in advance of the glass front 7. In this wall 12, is an opening 13, for delivery passage of a fruit entity therethrough. Leading toward this opening 13, is a delivery tray having a bottom wall 14, side walls 15 and 16 and a back wall 17. These walls of the tray slope toward the bottom wall 14, and have sufficient length to receive a fruit entity from any of the housings, four in number, as will be clearly seen by reference to Figs. 1, 2 or 3. It is advantageous to extend the bottom wall 14, as shown at 18, and provide the same with an upwardly extending flange 19 so that when an entity is delivered, the flange will hold the same against rolling off from the outer end portion of wall 18.

Reference will next be made to the improved means for receiving and delivering fruit entities from the housings to the tray. Said means, in the present form of the invention, is embodied in a hollow cylinder 20. This cylinder is rotatively mounted, as will be specifically described later on, in subjacent relation to all of the housings so as to receive fruit entities therefrom. As will be seen from Figs. 3 and 4, the upper peripheral portion of the cylinder 20, is disposed sufficiently below wall 6 to permit the lowermost entity of the column to project below the housing, or in other words, below wall 6, and, as shown in Fig. 4, come in contact with the cylinder.

Thus it will be seen that before the lowermost entities are discharged from their housings, they are supported by the cylinder. The cylinder 20, is shown provided with four entity receivers or openings designated at 21, this number being equal to the number of housings. These openings 21, as will be seen from Fig. 1, are located to come into alinement with their respective housings but are sequentially and spirally disposed about and longitudinally of the periphery of the cylinder 20 in such a manner that these openings will consecutively come into registry with their respective housings. In the most preferred form, as shown, these openings are equi-distantly spaced circumferentially of the cylinder so that when the cylinder is given a quarter turn, one opening 21 will move into registry with one housing while another that has previously received an entity, will be advanced to a position to deliver such entity. The receiving position is shown in Fig. 3, and the delivery position is shown in Fig. 4. However, as a matter of fact, there is always at least one opening in a receiving position and always one opening in a delivery position. The action of the cylinder 20 will be more particularly described in the explanation of the operation of the machine.

Means is provided for preventing the fruit entities from either wedging or being bruised by engagement with the marginal edges of the openings 21, and such means will next be described in detail.

Opposite each opening 21, is a skeleton holder which may consist of radially disposed arms 22, properly dished, as shown in Figs. 1 and 3, to receive and support the substantially spherical fruit entities so that the peripheries of the latter will not be forced against the margins of the openings 21.

These fruit holders and supporters 22, are shown mounted on lugs 23, suitably secured to the wall of the cylinder 20. I may employ a screw 25 for anchoring the receivers 22 to said lugs and the latter may be provided with supporting extensions 26, projecting along the under sides of the arms to not only support the latter but also to reinforce the same. These lugs are of such height that they support the holders 22 in a manner to maintain the fruit entities slightly out of contact, at least out of injurious contact, with the margins of openings 21, and also in projecting relation to the periphery of the cylinder 20.

Reference will next be made to the manner and means of mounting the cylinder 20, and to the means of operating the same.

At the left hand end, viewing Fig. 1, the cylinder 20 is or may be provided with a trunnion 27 journalled in a bearing 28. At the right hand end, the cylinder 20 is provided with a shaft 29 that may be slipped into a U-shaped bearing 30. Therefore it will thus be seen that, essentially, the cylinder 20 is rotatively mounted in subjacent relation to the housings. At its right hand end, viewing Fig. 1, the cylinder 20 is provided with a notched disc 31 and the same is provided as seen in Fig. 5, with four locking notches 32, which are lined up with the openings 21, or rather with the points at which the cylinder is to be arrested. Intermediate said locking notches, are ratchet notches 33, four in number. A locking pawl 34 is shown pivotally mounted at 35 to the back wall 2. The locking end 36 is adapted to engage notches 32, and lock the cylinder in the positions which it is desired to hold the same. Said pawl 24 has a releasing lug 37, the purpose of which will presently appear. A ratchet pawl 38 is pivoted at 39, and has gravity engagement with disc 31 and engages notches 33 to prevent lost motion movement of the cylinder 20 in a clockwise direction, viewing Fig. 5.

A ratchet disc 40, having ratchet notches 41, four in number, is fixed to either the cylinder 20 or the shaft 29 to be rotated therewith. A gear disc 42, having a mutilated bevel gear section 43, thereon, is freely rotatable on shaft 29 and is disposed between disc 40 and a sleeve 44. Disc 40, carries a pawl 45, adapted to engage teeth 41 and is actuated by a suitable spring 46. Said disc 42 is provided with a pawl actuating arm 47, adapted to engage lug 37 to throw pawl 34 out of engagement with any one of the notches 32. A bevel gear 48 meshes with gear section 43 and is mounted on shaft 49 that is suitably journalled in wall 12 and in a bearing 50, on sleeve 44. A suitable manual grip 51 is mounted on shaft 49 whereby the latter may be manually turned, by the purchaser. The turning movement of shaft 49, is subject to the insertion of a coin or token but as the coin controlled feature cannot be claimed in a case defining the vending feature, the coin controlled feature is not illustrated in detail.

The operation of the machine will next be described in detail.

It is desired to point out again, that at least one opening 21, will always be in a fruit receiving position, as shown in Fig. 3, while all the others will be in varying degrees, out of a receiving position. Thus, that column of fruit above the opening that is in a receiving position, will rest upon the fruit entity that has been received in the opening, as shown in Fig. 3. The lowermost entities of all the other columns of fruit, will rest upon the imperforate peripheral portion of the cylinder 20. It will now be clear, viewing Fig. 3, that the superimposed fruit entities cannot force the apple that has been received in the cylinder, into injurious contact with the margins of the opening because the holder 23 supports the apple out of contact with said margins.

Now assuming that a purchaser desired to operate the machine after depositing the required token or coin, he would first manually operate the grip 51 to the right or in a clockwise direction viewing Fig. 1, thereby turning disc 42 clockwise, viewing Fig. 5. This would swing arm 47 into engagement with lug 37, and would raise pawl 34 out of engagement with the upper notch 32, thereby releasing the cylinder 20 from a pawl locked condition. After this has happened, the gravity pawl 38 would prevent turning of the cylinder 20, in a clockwise direction, viewing Fig. 5. This resultant movement of disc 42, would carry back pawl 45 into engagement with the next rearmost tooth 41. This may be termed the releasing movement or unlocking movement.

After the cylinder has been unlocked, then, the shaft 49 is turned in a contra-clockwise direction, viewing Fig. 1, and this imparts a like direction of movement to disc 42, through gear 48 and section 43, which movement is continued until the pawl 34, riding on the blank portion of disc 31, comes into engagement with the next notch 32, whereupon the turning movement of cylinder 20 is arrested and locked.

The unlocking movement of the parts in Fig. 5, is shown in Fig. 6, and the corresponding movement of pawl 45, is shown in Figs. 7 and 8.

Now the turning movement of cylinder 20, just described, is a quarter turn from the Fig. 3, position to the Fig. 4, position, in the present form of the invention.

As the cylinder 20 is turned from the Fig. 4, to the Fig. 3, position, the fruit entity in the holder is moved from under the fruit column into the delivery position shown in Fig. 4, and falls out of the holder by gravity into the tray and rolls down wall 14, out through opening 13, and against flange 19, where it is accessible to the purchaser.

This quarter movement that discharges an apple or other fruit entity, will, as previously described, advance another opening 20, into registry with its respective housing so that as one apple is discharged from the cylinder, another will be received thereby. It will also be understood that in this particular form of the invention, the cylinder is always turned in one direction, the pawl 38, preventing turning movement otherwise.

Further, the openings 20 are located in sequential relation so that the apples are discharged from the housings serially thereby avoiding the unattractive appearance which would result if all the contents of one housing were discharged before the remaining housings were drawn upon.

It is believed that the invention will be fully understood from the foregoing description, and while one specific form of the invention is shown herein, it is not desired that the invention be thus limited except for such limitations as the claims may import.

I claim:

1. In a fruit vending machine, a series of columnar housings for enclosing columns of fruit entities in superimposed relation, a hollow cylinder subjacent said housings for supporting the fruit entities therein, said cylinder having a series of receiving and discharge openings circumferentially disposed about said cylinder to sequentially come into registry with said housings, each opening having a fruit holder therein limiting ingress of the entity into said cylinder, and means for imparting rotative movement to said cylinder to discharge the received entity and dispose another opening in receiving relation with another housing.

2. In a fruit vending machine, a housing for enclosing a column of superimposed fruit entities, a rotative cylinder in subjacent supporting relation to the column of fruit and having an opening adapted to register therewith, a fruit holder in said opening adapted to support a received entity therein with a portion of the entity projecting beyond the periphery of the cylinder and supporting the next lowermost entity of the column out of contact with said cylinder until the latter has been turned sufficiently toward a delivery position to free the entity held therein from the lowermost entity of said column of fruit.

In witness whereof, I have hereunto affixed my signature.

NOAH H. MASSIE.